Figure 1:
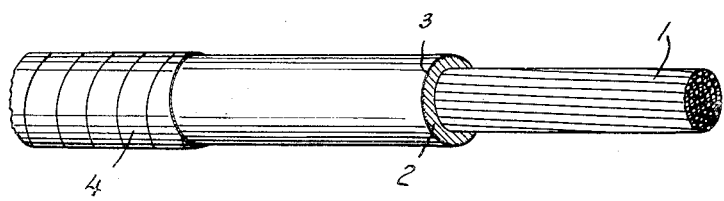

June 18, 1935. C. R. BOGGS 2,005,360

HIGH TENSION RUBBER INSULATED CABLE

Filed April 14, 1932

INVENTOR
Charles R. Boggs
BY
ATTORNEYS

Patented June 18, 1935

2,005,360

UNITED STATES PATENT OFFICE 2,005,360

HIGH TENSION RUBBER INSULATED CABLE

Charles R. Boggs, Waban, Mass., assignor to Simplex Wire & Cable Company, Boston, Mass., a corporation of Massachusetts Application April 14, 1932, Serial No. 605,164

1 Claim. (Cl. 173—266)

This invention relates to improvements in rubber insulated cables for high voltage service. The invention includes methods of improving the electrical properties of rubber insulated conductors and improved rubber insulated conductors such as are embodied in such cables.

Vulcanized rubber insulation possesses some qualities which are ideal for high voltage insulation. It has high dielectric strength. It is flexible. It can be made to conform to extreme limits of uniformity. It can expand, contract and flex without the formation of internal air pockets. It can be made to have extremely long life.

In spite of these qualities, however, rubber insulation has generally been considered unsuitable for operation at voltages, conductor to ground, above 12,000. For operation at higher voltages, impregnated paper insulation is usually used. The highest voltage, conductor to ground, at which a rubber insulated cable is operated, so far as I am aware, is 19,000 and in that instance the cable is a submarine cable. Impregnated paper insulation of the solid type is commonly operated at voltages, conductor to ground, as high as 43,000 and impregnated paper insulation of the oil filled type at voltages, conductor to ground, as high as 76,000.

Vulcanized rubber insulation has been found unsuitable for high voltage operation because ozone, formed as the result of corona discharge through air spaces adjacent the rubber insulation due to excessive voltage stress across such air spaces, induces rapid failure of the rubber insulation. Any air space, air pocket or air film adjacent the rubber insulation is a potential source of ozone formation in high voltage operation.

Proposals to overcome this limitation of vulcanized rubber insulation may be divided into two general classes, (1) proposals to modify the character of the rubber insulation and (2) proposals to protect the rubber insulation by a surface covering. The expedients described in Letters Patent Number 1,791,402, granted to Simplex Wire & Cable Company, February 3, 1931, on an application of George J. Crowdes, will illustrate the first class. The second class may be subdivided into proposals to protect the vulcanized rubber insulation by means of a covering resistant to ozone and proposals to protect the rubber insulation with a conducting covering relieving the voltage stress at the surface of the vulcanized rubber insulation.

These proposals to protect the rubber insulation by means of a conducting covering relieving the voltage stress at the surface of the vulcanized rubber insulation apparently offer maximum advantage with respect to full utilization of the desirable qualities of vulcanized rubber insulation, but as hitherto made they have all been subject to practical limitations with respect to perfection of the protection. A local failure, as well as a general failure, precludes the successful operation of such a cable, and such applied conducting coverings, metal tapes, braids and jackets for example, have not been successfully applied to eliminate all air spaces adjacent the surface of the vulcanized rubber insulation. Flexing of such cables, for example, tends to form air spaces between such conducting coverings and the surface of the vulcanized rubber insulation. Any one such air space may cause failure of the cable.

This invention eliminates the destructive influence of ozone by providing a conducting surface film integral with the vulcanized rubber insulation which, in conjunction with a conducting sheath applied over and in contact therewith, operates to relieve the voltage stress at the surface of the vulcanized rubber insulation and thus to prevent the formation of ozone adjacent the surface of the vulcanized rubber insulation. This conducting film, being integral with the vulcanized rubber insulation, cannot be displaced therefrom by expansion or contraction of the insulation or by flexing of the cable, and therefore insures complete elimination of air spaces between the protecting film and the vulcanized rubber insulation. The invention thus makes possible the utilization of substantially the full dielectric strength of the vulcanized rubber insulation. This result is accomplished, moreover, without sacrifice of any of the desirable properties of vulcanized rubber insulation. The invention does more than make it possible to increase the threshold voltage at which the formation of ozone begins; it makes possible complete elimination of ozone formation at any voltage that may be applied up to that voltage corresponding to the maximum dielectric strength of the vulcanized rubber insulation.

The improved method of the invention comprises applying unvulcanized rubber insulation to the conductor, incorporating a solid conducting material in a fine state of subdivision in the surface of this unvulcanized rubber insulation in quantity sufficient to form a conducting surface film integral with the rubber insulation when vulcanized, and thereafter vulcanizing this rubber insulation and applying a conducting sheath over and in contact with the surface of this rubber insulation. I have found aluminum powder and graphite to be particularly advantageous as conducting materials to be incorporated in the surface of the unvulcanized rubber insulation. Other powdered metals are also useful, copper and the various bronzes for example. The conducting sheath may consist, for example, of a lead jacket or a copper or brass tape applied over the surface of the rubber insulation. The conductivity of the conducting surface films made an integral part of the vulcanized rubber insulation in carrying out the invention is, as will be apparent, not unlimited. The conductivity of the conducting sheath applied over the surface of the rubber insulation, however, can be easily made as high as necessary for any practical purpose, thus leaving to the integral conducting film only that part of the burden of relief of voltage stress adjacent the surface of the rubber insulation existing in areas over which the integral conducting film is not in direct contact with the conducting sheath. The integral conducting surface film must have a conductivity sufficient to reduce the voltage stress across any such areas over which the integral conducting surface film is not in direct contact with the conducting sheath to a value short of that at which the formation of ozone begins. Each such area in a cable provided with the conducting sheath but lacking the integral conducting surface film of this invention would represent a potential source of ozone formation because of the voltage stress across the air space adjacent this area on the surface of the rubber insulation. This possibility is eliminated by the present invention. The conducting sheath may be applied over the surface of the rubber insulation before or after vulcanization; it may consist, for example, of a lead jacket applied over the rubber insulation prior to vulcanization and in which the rubber insulation is vulcanized. In order to eliminate the formation of ozone between the conductor and the rubber insulation, because of air spaces existing in this region, the rubber insulation can be cemented to the conductor.

The improved insulated electrical conductor of the invention comprises a conductor and vulcanized rubber insulation thereon, this rubber insulation including a conducting surface film of a solid conducting material in a fine state of subdivision integral with this vulcanized rubber insulation, and a conducting sheath over and in contact with the surface of this rubber insulation. The conducting material of the integral conducting surface film may, for example, be powdered metal and in particular aluminum powder, or graphite, as previously mentioned. The conducting sheath may consist, for example, of a lead jacket or a copper or brass tape applied over the surface of the rubber insulation, again as previously mentioned.

Figure 2:
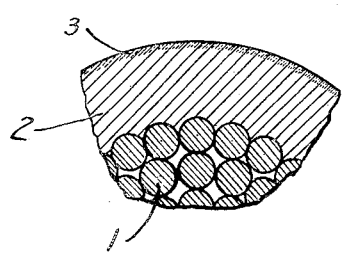

A fragment of an insulated electrical conductor embodying my invention is illustrated in Fig. 1 of the accompanying drawing, an enlarged detail of a portion of that fragment being illustrated in Fig. 2. The insulated conductor illustrated comprises a conductor 1, of stranded wire, vulcanized rubber insulation 2, of any conventional type, this rubber insulation, however, including an integral conducting surface film 3 of a solid conducting material in a fine state of subdivision, and a conducting sheath 4, of metallic tape, applied over and in contact with the surface of the vulcanized rubber insulation. For the purpose of clarity, the sheath 4, illustrated in Fig. 1, has been omitted from Fig. 2.

In one convenient way of carrying out the invention, the conducting material to be incorporated in the surface of the unvulcanized rubber insulation is incorporated as the conductor passes from the conventional tubing machine, for applying the unvulcanized rubber insulation to the conductor, to the conventional lead press, for applying a lead jacket in which the rubber insulation is vulcanized, the vulcanization also being carried out in the conventional manner. In conventional practice, the conductor covered with the unvulcanized rubber insulation is passed through chalk or the like as it leaves the tubing machine. In carrying out this invention, it may be passed instead, through aluminum powder, for example. The proportion of aluminum powder so incorporated in the surface of the unvulcanized rubber insulation can be increased by wiping the aluminum powder into the surface of the unvulcanized rubber insulation and this wiping operation can be repeated as many times as may be desired. Additional quantities of the aluminum powder may be applied to the surface of the unvulcanized rubber insulation as the conductor enters the lead press. If the lead jacket is not to be used as the conducting sheath applied over and in contact with the integral conducting film on the surface of the vulcanized rubber insulation, the lead sheath is stripped from the insulated conductor in the usual way, following the vulvanizing operation, and the desired conducting sheath applied. A copper or brass tape, for example, may be wound on the surface of the vulcanized rubber insulation in the conventional manner after removal of the lead jacket in which the insulated conductor has been vulcanized.

The resistivity of the integral conducting surface film requisite to afford adequate protection varies in different services. Also, for alternating current service it is the A. C. resistivity which is important whereas for direct current service it is the D. C. resistivity which is important. Where the mean diameter of areas over which the integral conducting surface film is not in direct contact with the conducting sheath does not exceed about three-fourths of an inch, adequate protection is usually secured if the integral conducting surface film has a resistivity, measured for conditions corresponding to those of operation, for example, of about 1000 megohms per square inch of surface of rubber insulation, or less, for example. Powdered metals are more particularly useful in cables for alternating current service; graphite is useful for both classes of service.

The insulated conductors embodying the invention can be incorporated in the conventional manner in any conventional cable construction.

I claim:

The process of manufacturing electrical cable insulated with vulcanized rubber and having increased life when operated at high voltages, which includes the steps of cementing unvulcanized rubber insulation to the conductor, applying a layer of finely divided conducting material on the surface of said unvulcanized rubber, applying a sheath over and in intimate contact with said layer, vulcanizing the rubber insulation thus encased in said sheath, whereby said layer of finely divided conducting material becomes a conductive film which is a permanently integral part of the surface of said vulcanized rubber insulation, stripping said sheath from said cable, and wrapping said cable with a metallic tape so as to be in intimate electrical contact with said conducting film.

CHARLES R. BOGGS.